United States Patent
Hs et al.

(10) Patent No.: US 11,954,535 B2
(45) Date of Patent: Apr. 9, 2024

(54) SYSTEMS, DEVICES, AND METHODS FOR EXECUTION OF TASKS IN AN INTERNET-OF-THINGS (IOT) ENVIRONMENT

(71) Applicants: Raju Hs, Bangalore (IN); Himanshu Kumar Singh, Bangalore (IN)

(72) Inventors: Raju Hs, Bangalore (IN); Himanshu Kumar Singh, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 331 days.

(21) Appl. No.: 17/322,243

(22) Filed: May 17, 2021

(65) Prior Publication Data
US 2021/0271516 A1 Sep. 2, 2021

Related U.S. Application Data

(63) Continuation of application No. PCT/EP2019/082326, filed on Nov. 22, 2019.

(30) Foreign Application Priority Data

Nov. 22, 2018 (EP) ..................................... 18207814

(51) Int. Cl.
G06F 9/50 (2006.01)
G06F 9/48 (2006.01)
G16Y 10/75 (2020.01)
H04L 67/12 (2022.01)

(52) U.S. Cl.
CPC .......... *G06F 9/5088* (2013.01); *G06F 9/4856* (2013.01); *G06F 9/5022* (2013.01); *G06F 9/5083* (2013.01); *G16Y 10/75* (2020.01); *H04L 67/12* (2013.01); *G06F 9/4881* (2013.01); *G06F 9/5005* (2013.01); *G06F 2209/509* (2013.01)

(58) Field of Classification Search
None
See application file for complete search history.

(56) References Cited

U.S. PATENT DOCUMENTS

2017/0367086 A1 12/2017 Pistoia et al.

OTHER PUBLICATIONS

Mao et al., "Mobile Edge Computing: Survey and Research Outlook", Jan. 4, 2017, IEEE Communications Surveys & Tutorials, pp. 1-30. (Year: 2017).*

(Continued)

*Primary Examiner* — Qing Yuan Wu
(74) *Attorney, Agent, or Firm* — Lempia Summerfield Katz LLC

(57) ABSTRACT

Systems, devices, and methods of execution one or more tasks in an Internet-of-Things (IoT) environment are disclosed herein. An exemplary method includes determining an event associated with overloading of a first sensor node in the IoT environment based on resources available in real-time on the first sensor node, wherein the event is determined based on number of tasks pending for execution at the first sensor node. Further, the method includes identifying the one or more tasks executable by a second sensor node. Furthermore, the method includes establishing communication with the second sensor node in the IoT environment and assigning the one or more tasks to the second sensor node such that the second sensor node executes the one or more tasks.

12 Claims, 7 Drawing Sheets

(56) References Cited

OTHER PUBLICATIONS

Kwak et al., "DREAM: Dynamic Resource and Task Allocation for Energy Minimization in Mobile Cloud Systems", Dec. 2015, IEEE Journal on Selected Areas in Communications, pp. 2510-2523. (Year: 2015).*

International Preliminary Report on Patentability for International Patent Application PCT/EP2019/082326 dated Feb. 11, 2021.

Saeed, Ahmed, et al. "Vision: The case for symbiosis in the internet of things." Proceedings of the 6th International Workshop on Mobile Cloud Computing and Services. 2015. pp. 23-27.

Sahni, Yuvraj, et al. "Edge mesh: A new paradigm to enable distributed intelligence in internet of things." IEEE access 5 (2017): 16441-16458.

* cited by examiner

SYSTEMS, DEVICES, AND METHODS FOR EXECUTION OF TASKS IN AN INTERNET-OF-THINGS (IOT) ENVIRONMENT

The present patent document is a continuation of PCT Application Serial No. PCT/EP2019/082326, filed Nov. 22, 2019, designating the United States, which is hereby incorporated by reference, and this patent document also claims the benefit of European Patent Application No. 18207814.7, filed Nov. 22, 2018, which is also hereby incorporated by reference.

FIELD OF TECHNOLOGY

The present disclosure relates to the execution of tasks with distributed computing resources. More particularly, the present disclosure relates to managing execution of tasks in an Internet-of-Things (IoT) Environment.

BACKGROUND

In an Internet of Things (IoT) environment, there are multiple devices, ranging from small field devices such as sensor nodes to handheld devices such as smart phone. The task performed on the devices may require minor compute or a resource intensive compute.

To manage the resource requirement, the task/sub-task may be transferred to a Cloud platform. The transfer is performed in steps, where one such step is task partitioning wherein the task executed on the sensor node is partitioned to decide which partition to transfer on the Cloud platform. Further, binaries required for execution the task or the sub-task of the application is installed on Cloud platform. This method of transferring to the Cloud platform may not preferred, due to bandwidth requirements, latency, privacy, and security concerns.

The following prior art documents disclose technological background technology for the present disclosure.

Document D1 (Sahni Yuvraj et al., "Edge Mesh: A New Paradigm to Enable Distributed Intelligence in Internet of Things," IEEE Access, vol. 5, Aug. 15, 2017, pp. 16441-16458) relates to the Internet of Things in terms of a task management framework. The task management framework retrieves information about a network, and other resources and managers load the distribution between different entities of the network. One of the main objectives of computation management is to share the load among different edge devices. Devices may either offload some of their task components to other devices or even fully offload tasks to a better device which may handle the task.

Document D2 (Ahmed Saeed et al., "Vision: The Case for Symbiosis in the Internet of Things," Proceedings of the $6^{th}$ International Workshop on Mobile Cloud Computing and Services, MCS '15, Jan. 1, 2015, pp. 23-27) describes task configuration and task scheduling in a cloud network.

Document D3 (U.S. Patent Application Publication No. 2017/0367086) discloses that in a network each collaborative mobile device may execute at least one task assigned thereto and provide execution results of the tasks with a target mobile device over a mobile ad hoc network. The target mobile device may merge (for example, combine) the execution results of the tasks.

In light of the above, there is a need to manage execution of tasks in the IoT environment.

Therefore, the object of the present disclosure is to execute tasks in the IoT environment by providing low latency and reduced bandwidth consumption.

SUMMARY AND DESCRIPTION

The scope of the present disclosure is defined solely by the appended claims and is not affected to any degree by the statements within this summary. The present embodiments may obviate one or more of the drawbacks or limitations in the related art.

The object of the present disclosure is achieved by a method of execution one or more tasks in an Internet-of-Things (IoT) environment. As used herein, IoT environment refers to a distributed computing environment with multiple devices with differing compute resources. These devices are IoT enabled devices such as sensors, sensor nodes, edge devices, etc. The IoT enabled devices are connected to an IoT cloud platform and actuators via the Internet.

As used herein sensors refer to devices that may be configured to measure a physical quantity and convert the physical quantity into a signal. Example of the sensors include temperature sensors, video cameras, audio recorders, motion sensors, humidity sensors, smoke detectors, various gas sensors, radiation monitors, and other sensors. In some examples, the sensors may be IoT enabled smart sensors that includes, but is not limited to, processing logic such as one or more controllers or processors, memory, and communication interface. The smart sensors may be connected to multiple sensors and are referred to as sensor nodes.

As used herein, sensor nodes devices are communicatively coupled to multiple sensors in the IoT environment. The sensor nodes are equipped with processing capabilities and may include the sensors. Further, the sensor nodes are capable of detecting anomalies in the physical quantities measured by the sensors. The sensor nodes are communicatively coupled to edge devices. The edge devices refer to devices connected to the sensors and/or the sensor nodes on one end and to a remote server(s) such as computing server(s) or cloud platform on the other end. A network of the edge computing devices is referred to as a fog network.

As used herein, task or sub-task refers to artifacts that may be developed and deployed to serve a purpose. Exemplary artifacts may include applications (e.g., application for monitoring plant), simulation models, engineering configuration, digital twin models, code snippets, APIs, security applications, firmware, and so on. The tasks may be developed and deployed using a container instance. A container instance is a lightweight, stand-alone, executable package of applications which may be deployed and executed virtually on the sensor node or the edge device. Container instance may include files, environment variables, and libraries for the tasks to be executed. The container instance may be deployed on the edge device, (for example, from the cloud platform).

In an embodiment, the method may include defining a structure for a task suite including the tasks to be executed in the IoT environment. The task suite includes one or more tasks that are assigned to a sensor node. The structure of the task suite is configured such that the tasks are separable. Accordingly, the method advantageously provides for division of the tasks among the sensor nodes in the IoT environment. In another embodiment, the method may include establishment of communication between the tasks in the task suite such that the structure of the task suite is redefined after division.

The method includes determining an event associated with overloading or possible overloading of a first sensor node in the IoT environment. The event is determined based on resources available in real-time on the first sensor node and based on number of tasks pending for execution at the first sensor node. For example, the event may be a request to execute one or more tasks from the edge device. The first sensor node advantageously determines whether there is or will be potential overloading of its computing resources.

The method may further include defining overload parameters associated with the event associated with overloading of the first sensor node. As used herein the overload parameters are defined by resources available on the first sensor node, a minimum task resource requirement associated with the one or more tasks, priority of the tasks, and/or predicted resources on the first sensor node. As used herein, the minimum task resource requirement indicates minimum resources required to execute a task. As used herein, task is a basic work package to be executed/performed by an edge device or a sensor node.

The overload parameters are also defined by a non-transferrable resource requirement required for non-transferrable tasks that are executed only by the first sensor node. As used herein, the non-transferrable tasks are existing tasks on the first sensor node for execution only by the first sensor node. In addition, new non-transferrable tasks are new tasks assigned to the first sensor node for execution only by the first sensor node.

The method may include predicting the resources on the first sensor node for execution of the one or more tasks on the first sensor node based on the non-transferrable resource requirement. Further, the method may include determining the non-transferrable resource requirement for the non-transferrable tasks and the new non-transferrable tasks. In an embodiment, the predicted resources are predicted prior to assignment and deployment of the one or more tasks on the second sensor node. In another embodiment, the predicted resources are predicted prior to execution of the one or more tasks on the second sensor node. The staggered prediction of the predicted resources in the second sensor node is advantageous as changes in the resource availability of the second sensor node are considered.

The method may include determining the minimum task resource requirement for executing the one or more tasks based on a resource requirement specification associated with the one or more tasks. As used herein, the resource requirement specification indicates the minimum resources required for executing the one or more tasks in real-time. In an embodiment, the method may include obtaining the resource requirement specification associated with the one or more tasks from a task database. For example, the task database stores the tasks, associated field devices, and the associated resource requirement specification. The method may further include comparing the minimum task resource requirement with the predicted resources on the first sensor node and determining whether the resources available are less than, equal to, or greater than the minimum task resource requirement.

The method may include determining whether one or more resources may be freed-up on the first sensor node for execution of the new non-transferrable tasks when the resources available on the first sensor node are less than the non-transferrable resource requirement. Further, the method may include releasing the one or more resources on the first sensor node by assigning one of the transferrable tasks and the new transferrable tasks to the second sensor node.

The method includes identifying the one or more tasks executable by a second sensor node. The one or more tasks include transferrable tasks, predicted transferrable tasks, and new transferrable tasks. The transferrable tasks are existing tasks assigned to the first sensor node for execution. The predicted transferrable tasks are predicted tasks that may be routinely assigned to the first sensor node. The new transferrable tasks refer to new tasks that are assigned to the first sensor node and may be executed to other sensor nodes for execution. The first sensor node advantageously identifies which task among the one or more tasks is most suitable for assignment to the second sensor node.

The method may include transmitting an overload message to an edge device when the resources available on the first sensor node are less than the minimum task resource requirement. The overload message indicates an inability of the first sensor node to execute the one or more tasks. The method may further include receiving a sensor node database associated with sensor nodes in the IoT environment capable of executing the one or more tasks. The sensor node database stores the sensor nodes, associated field devices, and the associated resource availability. Accordingly, the first sensor node is advantageously capable of identifying the second sensor node based on the sensor node database.

The method may include identifying the second sensor node capable of executing the one or more tasks. The identification the second sensor node may be performed based on proximity of the first sensor node and the second sensor node to field device (such as actuators) associated with one or more tasks. The proximity of the first sensor node and the second sensor node directly impacts the energy required to transmit signals the field device. Accordingly, the method advantageously overcomes the constraints of latency and in-efficient energy consumption by processing tasks proximal to the field devices.

The method further includes establishing communication with the second sensor node in the IoT environment from the first sensor node. Furthermore, the method includes assigning the one or more tasks to the second sensor node such that the second sensor node executes the one or more tasks. The method may also include receiving an executed result of the one or more tasks from the second sensor node to the first sensor node. The method advantageously discloses a network of sensor nodes that are communicatively coupled and capable of executing tasks individually and in combination.

The object of the present disclosure is achieved by another method of execution one or more tasks in the IoT environment. The method is performed at the edge device and includes receiving the overload message from the first sensor node by the edge device. The method further includes determining a second sensor node capable of executing the one or more tasks, based on resources available on the first sensor node and the second sensor node, minimum task resource requirement associated with the one or more tasks, predicted resources on the first sensor node, and proximity of the first sensor node and the second sensor node to field device associated with one or more tasks.

The method also includes transmitting a task package associated with the one or more tasks when the one or more tasks are assigned to the second sensor node from the first sensor node. The task package includes binaries required to execute the one or more tasks. The method advantageously reduces data stored at the sensor nodes by transmitting the task package from the edge device to the sensor nodes for execution of the one or more tasks.

The method may further include transmitting details of the second sensor node to the first sensor node and confirming establishment of communication between the first sensor node and the second sensor node. For example, the confirmation of communication establishment may be made based on receipt of a confirmation signal from the first sensor node or from the second sensor node. The method may also include transmitting the task package associated with the one or more tasks when the confirmation is received. Therefore, the method advantageously transmits the task package only after confirmation and thereby reduces consumption of bandwidth.

The method may include determining a third sensor node capable of executing the one or more tasks when the communication between the first sensor node and second sensor node is not established. The method may further include transmitting the task package associated with the one or more tasks when the one or more tasks are assigned to the third sensor node from the first sensor node. Therefore, the method advantageously provides execution of the one or more tasks in the IoT environment.

The object of the present disclosure is achieved by a sensor node in an IoT environment. The sensor node includes one or more processors, a memory coupled to the processors. The memory includes a resource module configured for determining an event associated with overloading of the sensor node in the IoT environment based on resources available in real-time on the sensor node. The memory further includes an assignment module configured for establishing communication from the sensor node with a second sensor node in the IoT environment capable of executing one or more tasks, based on the event. The assignment module is configured for identifying the one or more tasks to be executed by the second sensor node. The assignment module is further configured for assigning the one or more tasks to the second sensor node, when the communication is established.

In an embodiment, the resource module is configured for defining overload parameters associated with the event associated with overloading of the sensor node. The overload parameters are defined by any one of resources available on the sensor node, minimum task resource requirement associated with the one or more tasks and predicted resources on the sensor node.

In an aspect of the embodiment, the resource module is configured for determining a non-transferrable resource requirement for the non-transferrable tasks and predicting the resources on the first sensor node for execution of the one or more tasks on the first sensor node based on the non-transferrable resource requirement.

In another aspect of the embodiment, the resource module is configured for determining the minimum task resource requirement for executing the one or more tasks based on a resource requirement specification associated with the one or more tasks. The resource requirement specification indicates the minimum resources required for executing the one or more tasks in real-time.

In yet another aspect of the embodiment, the resource module is configured for comparing the minimum task resource requirement with the predicted resources on the first sensor node and determining whether the resources available are less than, equal to or greater than the minimum task resource requirement.

The sensor node is an intelligent sensor node that is capable of determining whether the one or more tasks may be executed. If the sensor node is not able to execute, the sensor node is capable of assigning the one or more tasks to other sensor nodes for execution. Such a network of sensor nodes reduces dependency on edge devices for execution of the one or more tasks.

The object of the present disclosure is further achieved by an edge device in an IoT environment. The edge device includes an operating system and a memory. The memory includes a sensor node database having binaries of sensor nodes in the IoT environment stored therein. As used herein "binaries" refer to an executable or a single/set of artifacts containing logic that is required to process a task for a sensor node (for example, first sensor node). A task is assumed to be a self-contained module which may be processed based on a set of binaries. The task details are transferrable as a task package in a recognized format to another node (for example, a second sensor node) or the edge device.

In another embodiment, the IoT environment may include multiple edge devices. Each of the edge devices include memory to store associated binaries of sensor nodes that is connected to respective edge device. For example, sensor node A is connected to edge device A. Sensor node B is connected to edge device B. The binaries for tasks associated with sensor node A are stored at the edge device A. The binaries for tasks associated with sensor node B are stored at the edge device B. In an embodiment, one or more tasks are assigned from sensor node A to sensor node B. The binaries of the one or more tasks are transferred from edge device A directly to sensor node B or via edge device B. The distribution of the binaries is referred to as a distributed task repository.

The memory further includes a node management module configured for receiving the overload message from the first sensor node. The node management module is further configured for determining a second sensor node capable of executing the one or more tasks, based on resources available on the first sensor node and the second sensor node, a minimum task resource requirement associated with the one or more tasks, predicted resources on the first sensor node, and a proximity of the first sensor node and the second sensor node to field device associated with one or more tasks.

The memory also includes a dataflow module configured for transmitting details of the second sensor node to the first sensor node and confirming establishment of communication between the first sensor node and the second sensor node. The dataflow module is further configured for transmitting the task package associated with the one or more tasks based on the confirmation and when the one or more tasks are assigned to the second sensor node from the first sensor node. The edge device advantageously facilitates execution of the one or more tasks in the IoT environment with minimal consumption of bandwidth.

In an embodiment, the memory may also include a recovery module to recover data stored in the memory. The recovery module may be configured to recover a clock data. The recovery module provides that data is not lost during assignment of one or more tasks from the first sensor node to the second sensor node.

The object of the present disclosure is further achieved by computer-program product, having machine-readable instructions stored therein, that when executed by a processor, cause the processor to perform method acts described above. The processor may be a processor of a sensor node or a processor of an edge device.

The above-mentioned and other features of the disclosure will now be addressed with reference to the accompanying drawings of the present disclosure. The illustrated embodiments are intended to illustrate, but not limit the disclosure.

BRIEF DESCRIPTION OF THE DRAWINGS

The present disclosure is further described hereinafter with reference to illustrated embodiments shown in the accompanying drawings, in which.

DETAILED DESCRIPTION

Figure 1:
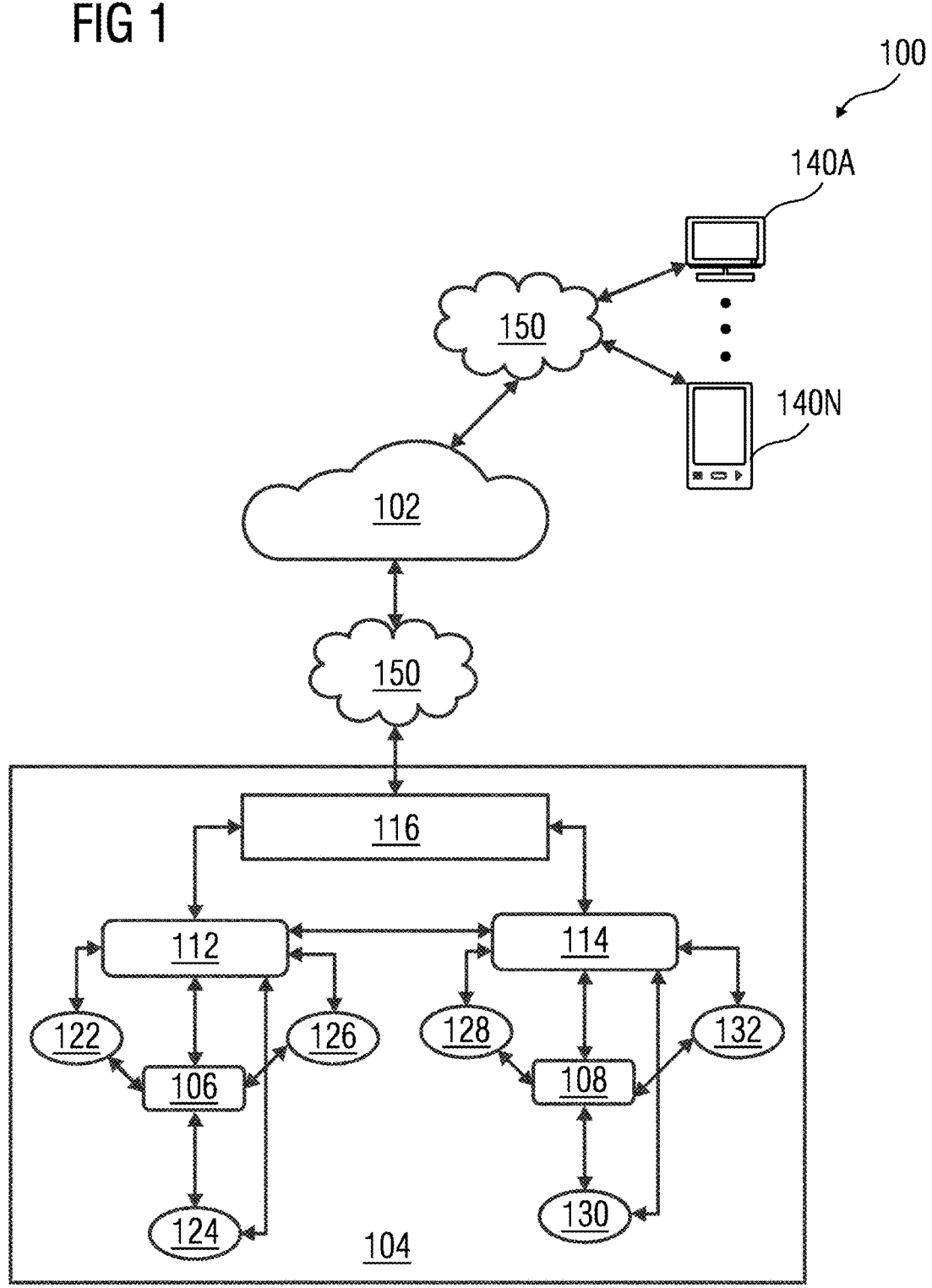
FIG. 1 is a schematic representation of an Internet-of-Things (IoT) environment, according to an embodiment.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of an Internet-of-Things (IoT) environment 100, according to an embodiment. The IoT environment 100 includes an IoT cloud platform 102, an industrial plant 104 including edge device 116, sensor nodes 112, 114 and groups of sensors 122-126 and 128-132, and field devices 106 and 108. The field devices 106, 108 may include servers, robots, switches, automation devices, motors, valves, pumps, actuators, sensors, and other industrial equipment. Although, FIG. 1 illustrates the cloud platform 102 connected to one industrial plant 104, one skilled in the art may envision that the cloud platform 102 may be connected to several industrial plants located at different locations via the network 150. Further, user devices 140A-N may be able to access the industrial plant 104 via the cloud platform 102.

Each group of sensors 122-126 and 128-132 is connected to respective sensor nodes 112 and 114 via wired network or wireless network. Further the sensor nodes 112 and 114 are connected via low powered network protocol such as REpresentational State Transfer (REST), Message Queue Telemetry Transport (MQTT), and Advanced Message Queuing Protocol (AMQP), etc. Each of the sensor nodes 112 and 114 are connected to the edge device 116 via wired network or wireless network. The edge device 116 is connected to the IoT cloud platform 102 via the network 150, (for example, wide area network).

The sensors 122-126 and 128-132 include a heat sensor, humidity sensor, light sensor, vibration sensor, proximity sensor, etc. The sensor nodes 112 and 114 include the sensors 122-126 and 128-132, respectively. Further, the sensor nodes 112 and 114 include a processor, memory, and a communication unit (not shown). The sensor nodes 112 and 114 are configured to perform computation on sensor data from the sensors 122-126 and 128-132. The computation may be defined as one or more tasks. The sensor nodes 112 and 114 are configured to decide whether the one or more tasks will overload the processor and the memory. Accordingly, the sensor nodes 112 and 114 are smart sensor nodes configured to determine whether workload offloading is required.

The edge device 116 is configured with higher computation power compared to the sensor nodes 112 and 114. The edge device is configured to post process the sensor data collected by the sensor nodes 112 and 114 and selectively send the processed data and the sensor data to the cloud platform 102. The edge device 116 is further configured to maintain a sensor node database for sensor nodes 112 and 114 connected to the edge device 116. The edge device 116 is also configured to maintain task packages associated with the one or more tasks.

The IoT cloud platform 102 is configured to provide multiple cloud services based on the processed data and sensor data sent from the edge device 116. The cloud services may include commissioning the industrial plant 104, monitoring and controlling the industrial plant 104, maintaining the industrial plant 104, upgrading the industrial plant 104, and so on. The cloud services may also include managing field devices 106 and 108 in the industrial plant 104, storing and analyzing plant data received from the field devices 1006, 108 via the edge device 116, visualizing the analyzed data to personnel associated with the industrial plant 104, downloading software/firmware onto the field devices 106, 108, etc.

Figure 2:
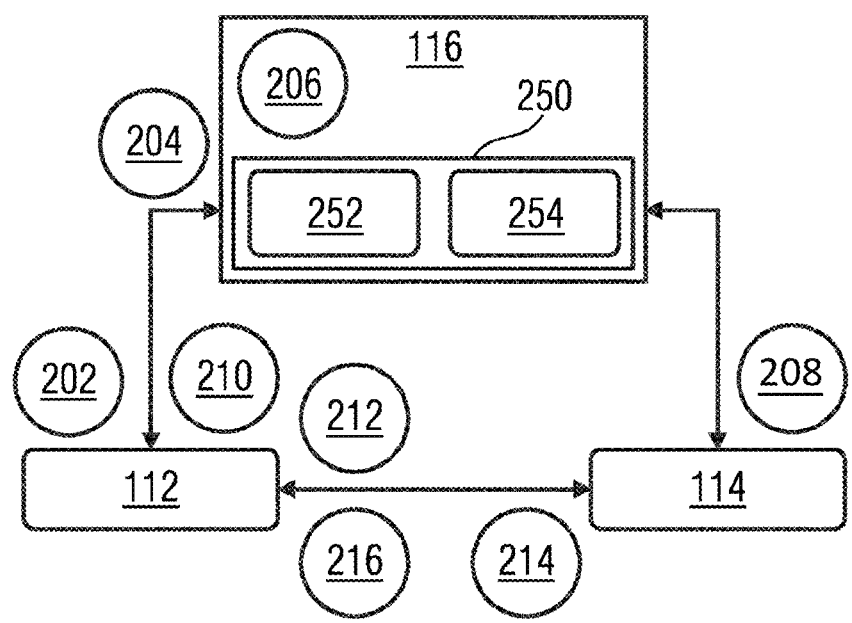
FIG. 2 is a schematic representation of an example of an operation of the sensor nodes and the edge device in the IoT environment in FIG. 1.

The method of offloading of the one or more tasks assigned to the sensor nodes 112 and 114 is described in FIG. 2. FIG. 2 is a schematic representation of operation of the sensor nodes 112, 114 and the edge device 116 in the IoT environment 100. The edge device 116 includes the sensor node database 250. The sensor node database 250 includes binaries 252 and 254 associated with sensor nodes 112 and 114, respectively. As used herein "binaries" refer to an executable or a single/set of artifacts containing logic that is required to process a task for a sensor node (for example, sensor node 112). A task is assumed to be a self-contained module which may be processed based on a set of binaries. The task details are transferrable as a task package in a recognized format to another node (for example, sensor node 114) or the edge device 116.

The operation offloading a task is performed in acts 202 to 214. At act 202, the sensor node 112 determines an event associated with overloading of its resources. The sensor node 112 decides to offload the task based on the event. The method of deciding the task to offload is explained in FIG. 5.

At act 204, the sensor node 112 initiates the workload transfer by sending an overload message to the edge device 116. At act 206, the edge device 116 determines whether the sensor node 114 capable of executing the tasks. The determination is made based on resources available on the sensor node 114, a minimum task resource requirement associated with the task, predicted resources on the sensor node 114, and a proximity of the sensor node 112 and the sensor node 114 to field devices 106, 108 associated with the tasks. In the present embodiment, the sensor node 114 is selected for offloading.

At act 208, the edge device 116 informs the sensor node 114 regarding the task and transfer. The sensor node 114 determines whether the sensor node 114 is ready for the task based on the method provided in FIG. 5. The edge device 116 then transfers task package associated with the task to the sensor node 114. Further, at act 210, the edge device 116 informs the sensor node 112 that sensor node 114 has been identified for workload offloading.

At act 212, the sensor node 114 informs the sensor node 112 that the sensor node 114 is ready for assignment of the task. At act 214, the sensor node 112 assigns the task to the sensor node 114. At act 216, the sensor node 114 executes the task and transmits executed results to the sensor node 112.

Figure 3:
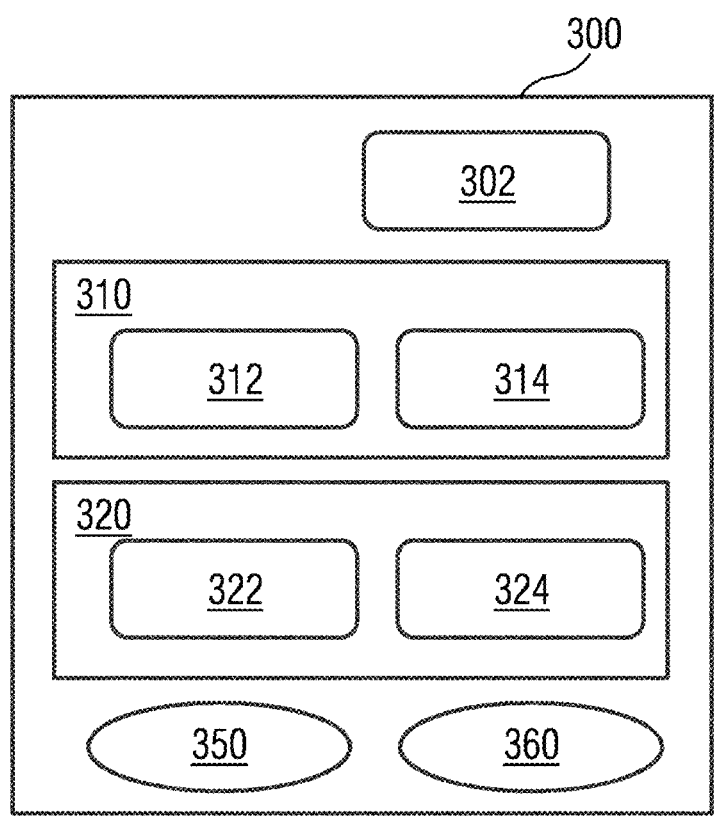
FIG. 3 is a schematic representation of an example of an edge device in the IoT environment in FIG. 1.

FIG. 3 is a schematic representation of the edge device in the IoT environment 100. For the purpose of FIG. 3, the edge device is referred with the number 300. The edge device 300 includes an operating system 302, a memory 310, and application runtime 320. Further, the edge device 300 includes embedded sensors 350 and 360.

The operating system 302 is an embedded real-time operating system (OS) such as the Linux™ operating system. The edge operating system 302 enables communication with the sensors, field devices, and the IoT cloud platform. The edge operating system 302 also allows running one or more software applications 322, 324 deployed in the edge device 300. The application runtime 320 is a layer on which the one or more software applications 322, 324 are installed and executed in real-time. The software applications 322, 324 are installed for processing plant data collected from the sensors and field devices. For example, the software applications 322 and 324 include simulation and analytics applications such as condition monitoring and predictive maintenance of field devices in the IoT environment.

The memory 310 includes the memory having a sensor node database having binaries of sensor nodes in the IoT environment stored therein. Further, the memory 310 includes a task database. For example, the task database stores the tasks, associated field devices, and the associated resource requirement specification.

The memory 310 also includes node management module 312 and dataflow module 314 that are executable on the edge device 300. The node management module 312 is configured for receiving the overload message from a first sensor node (e.g., sensor node 112) and determining whether second sensor node (e.g., sensor node 114) is capable of executing the one or more tasks, based on resources available on the second sensor node, a minimum task resource requirement associated with the one or more tasks, predicted resources on the second sensor node, and a proximity of the first sensor node and the second sensor node to field device associated with one or more tasks.

The dataflow module 314 is configured for transmitting details of the second sensor node to the first sensor node and confirming establishment of communication between the first sensor node and the second sensor node. Further, when the one or more tasks are assigned to the second sensor node, the dataflow module 314 transmits the task package associated with the one or more tasks based on the confirmation. The task package includes binaries required to execute the one or more tasks.

Figure 4:
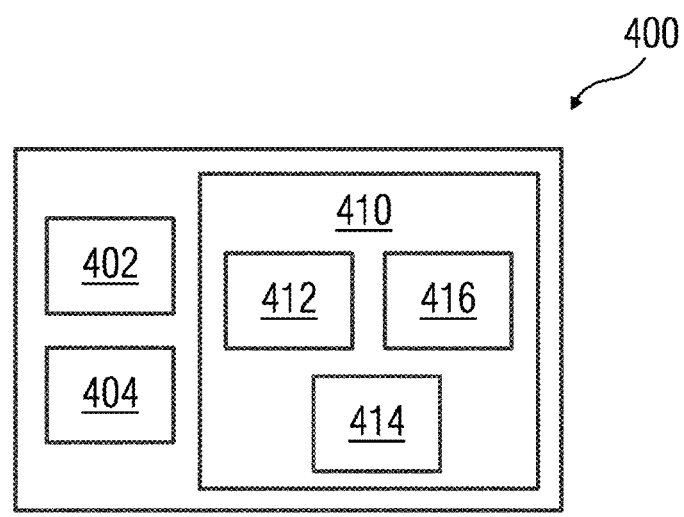
FIG. 4 is a schematic representation of an example of a sensor node in the IoT environment in FIG. 1.

FIG. 4 is a schematic representation of a sensor node in the IoT environment 100. For the purpose of FIG. 4, the sensor node is referred by the number 400. The sensor node 400 includes a communication unit 402, a processor 404, and a memory 410. The communication unit 402 is capable of transmitting and receiving data via low powered network protocol such as REpresentational State Transfer (REST), Message Queue Telemetry Transport (MQTT), and Advanced Message Queuing Protocol (AMQP), etc. The processor 404 is configured as a control unit to control operation of the communication unit 402 and the memory 410.

The memory 410 includes a resource module 412, an assignment module 414, and a task log 416. The processor 404 executes the modules 412-416 such that the operation described in FIG. 2 is performed.

The resource module 412 determines an event associated with overloading of the sensor node 400 in the IoT environment based on resources available in real-time on the sensor node 400. The resource module 412 determines the event based on number of tasks pending for execution at the sensor node 400. The pending tasks are determined from the task log 416.

The resource module 412 further defines overload parameters associated with the event. For example, the overload parameters are defined by any one of resources available on the sensor node, a minimum task resource requirement associated with the one or more tasks, and predicted resources on the sensor node. For example, the resource module 412 monitors processing/computing availability of the processor 404. Also, the resource module 412 monitors storage availability in the memory 410.

Further, the resource module 412 determines whether a task is transferable. In the present embodiment, the assignment of one or more tasks from sensor node 400 to another sensor node (not shown in FIG. 4) is performed when the one or more tasks include one of transferrable tasks, predicted transferrable tasks, and new transferrable tasks. The transferrable tasks are existing tasks assigned to the sensor node for execution and the new transferrable tasks refer to newly assigned tasks. The resource module 412 is configured to determine whether the one or more tasks may be executed on sensor node 400 or needs to be assigned to another sensor node.

Furthermore, the resource module 412 determines a non-transferrable resource requirement for the non-transferrable tasks and new non-transferrable tasks. The non-transferrable tasks are existing tasks on the sensor node for execution only by the first sensor node. The new non-transferrable tasks are new tasks assigned to the sensor node for execution only by the sensor node.

Also, the resource module 412 predicts resources on the sensor node 400 based on the non-transferrable resource requirement and determines the minimum task resource requirement for executing the one or more tasks. The minimum task resource requirement is based on a resource requirement specification associated with the one or more tasks. The resource requirement specification indicates the minimum resources required for executing the one or more tasks in real-time. The resource module 412 compares the minimum task resource requirement with the predicted resources on the sensor node 400. The comparison is used to determine whether the resources available are less than, equal to, or greater than the minimum task resource requirement. If the resources available are less than the minimum task resource requirement, the one or more tasks are assigned to another sensor node from sensor node 400.

The assignment module 414 establishes communication from the sensor node 400 with the other sensor node in the IoT environment capable of executing the one or more tasks. Further, the assignment module 414 identifies the one or more tasks to be executed by the other sensor node. For example, the assignment module 414 determines whether the new transferrable task is to be assigned or the existing transferrable task is to be assigned. When the communication is established, the assignment module 414 then assigns the one or more tasks to the other sensor node.

Figure 5:
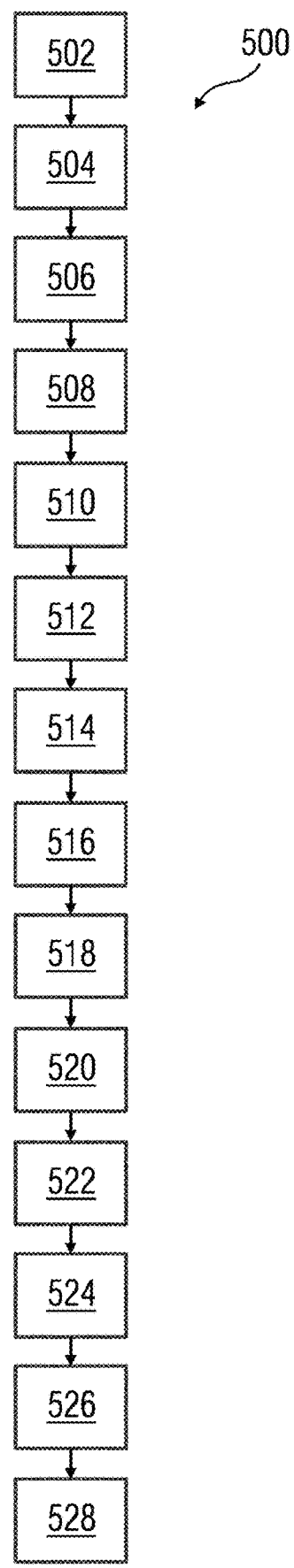
FIG. 5 is a flow diagram illustrating an exemplary method of executing one or more tasks in an IoT environment, according to an embodiment.

FIG. 5 is a flow diagram illustrating an exemplary method 500 of executing one or more tasks in an IoT environment, according to an embodiment. The method starts at act 502 by defining overload parameters associated with an event associated with overloading of a first sensor node. The overload parameters are defined by any one of resources available on the first sensor node, a minimum task resource requirement associated with the one or more tasks, and predicted resources on the first sensor node.

At act 504, an event associated with overloading of a first sensor node in the IoT environment is determined based on resources available in real-time on the first sensor node, wherein the event is determined based on number of tasks pending for execution at the first sensor node.

At act 506, a non-transferrable resource requirement is determined for non-transferrable tasks and new non-transferrable tasks. The non-transferrable tasks are existing tasks on the first sensor node for execution only by the first sensor node. Further, the new non-transferrable tasks are new tasks assigned to the first sensor node for execution only by the first sensor node.

At act 508, the one or more tasks are identified that are executable by a second sensor node. The one or more tasks include one of transferrable tasks, predicted transferrable tasks, and new transferrable tasks. The transferrable tasks are existing tasks assigned to the first sensor node for execution. The new transferrable tasks are new tasks assigned to the first sensor node for execution.

At act 510, availability of the resources on the first sensor node is predicted based on the non-transferrable resource requirement. The predicted resources indicate availability of the resources on the first sensor node for execution of the one or more tasks.

At act 512, the minimum task resource requirement for executing the one or more tasks is determined based on a resource requirement specification associated with the one or more tasks. The resource requirement specification indicates the minimum resources required for executing the one or more tasks in real-time.

At act 514, the minimum task resource requirement is compared with the predicted resources on the first sensor node. Based on the comparison, the first sensor node determines whether the resources available are less than, equal to, or greater than the minimum task resource requirement.

At act 516, a determination is made whether one or more resources may be freed-up on the first sensor node for execution of the new non-transferrable tasks. For example, when the resources available on the first sensor node are less than the non-transferrable resource requirement the first sensor node is required to prioritize the resources to support the new non-transferrable task.

At act 518, the one or more resources on the first sensor node are released by assigning one of the transferrable tasks and the new transferrable tasks to the second sensor node.

At act 520, an overload message is transmitted to an edge device when the resources available on the first sensor node are less than the minimum task resource requirement. The overload message indicates an inability of the first sensor node to execute the one or more tasks.

At act 522, a sensor node database is received by the first sensor node. The sensor node database provides sensor nodes in the IoT environment capable of executing the one or more tasks. In an embodiment, the first sensor node selects the second sensor node from the sensor node database. In another embodiment, the second sensor node details are provided in the sensor node database indicating that the second sensor node is ready to execute the one or more tasks.

At act 524, the first sensor node establishes communication with the second sensor node in the IoT environment. At act 526, the one or more tasks are assigned to the second sensor node such that the second sensor node executes the one or more tasks. At act 528, an executed result of the one or more tasks is received by the first sensor node from the second sensor node.

Figure 6:
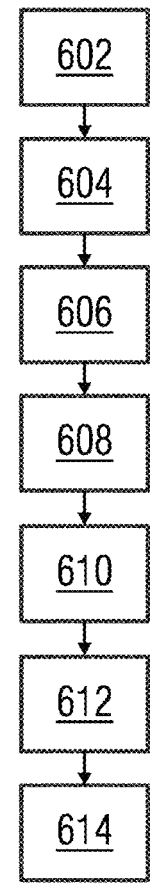
FIG. 6 is a flow diagram illustrating an exemplary method of executing one or more tasks in an IoT environment, according to another embodiment.

FIG. 6 is a flow diagram illustrating an exemplary method 600 of executing one or more tasks in an IoT environment, according to another embodiment. The method 600 starts at act 602 by receiving an overload message from a first sensor node on an edge device. The overload message indicates an inability of the first sensor node to execute the one or more tasks.

At act 604, a second sensor node capable of executing the one or more tasks is determined. The determination is based on resources available on the first sensor node and the second sensor node, minimum task resource requirement associated with the one or more tasks, predicted resources on the first sensor node and the second sensor node, and proximity of the first sensor node and the second sensor node to field device associated with one or more tasks. The determination is made in real-time by the edge device.

At act 606, details of the second sensor node are transmitted to the first sensor node. At act 608, confirmation of establishment of communication between the first sensor node and the second sensor node is made. At act 610, the task package associated with the one or more tasks is transmitted based on the confirmation.

At act 612, a third sensor node capable of executing the one or more tasks is determining when the communication between the first sensor node and second sensor node is not established. At act 614, the task package associated with the one or more tasks is transmitted when the one or more tasks are assigned to the third sensor node from the first sensor node.

Figure 7:
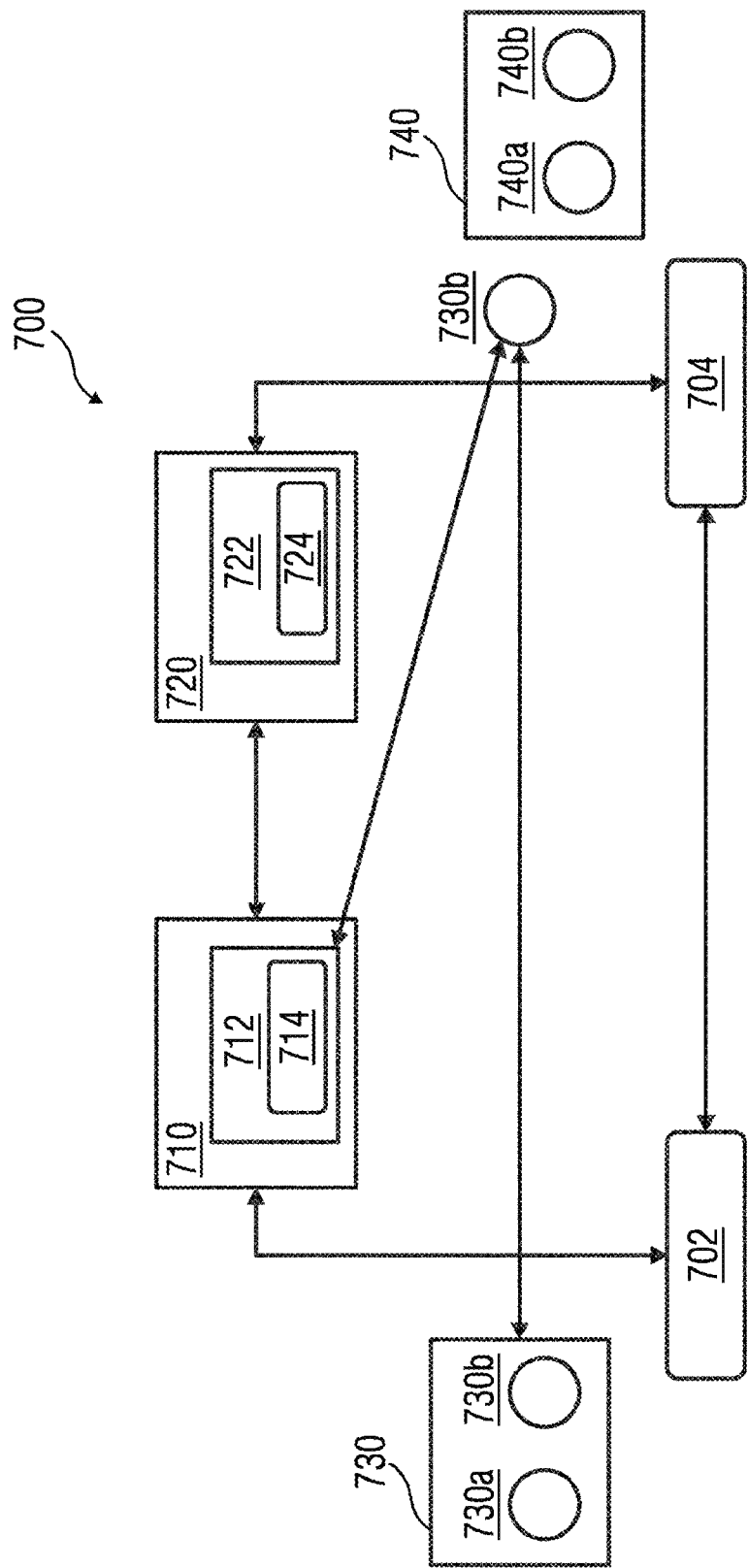
FIG. 7 is a schematic representation of operation of the sensor nodes and edge devices according to an embodiment.

FIG. 7 is a schematic representation of operation of the sensor nodes 702 and 704 and edge devices 710 and 720 in an IoT environment 700. The edge devices 710 and 720 each include the sensor node database 712 and 722, respectively. The sensor node database includes binaries 714 and 724 associated with task suites 730 and 740.

The task suites 730 and 740 are a set of tasks assigned to sensor nodes 702 and 704, respectively. The task suite 730 includes non-transferrable task 730*a* and one or more tasks 730*b* that are transferrable. The task suite 740 includes tasks 740*a* and 740*b*, which are transferrable.

In the event of overloading of sensor node 702, the task 730*b* is transferred to the sensor node 704 for execution. The sensor node 704 receives binaries associated with the task 730*b* directly from the edge device 710. In another embodiment, the edge device 710 transmits the binaries to the sensor node 704 via the edge device 720.

The sensor node 704 executes the task 730*b* and transmits the results to the sensor node 704. Further, the tasks 730*a* and 730*b* communicate with each other such that the task suite 730 is reformed after execution of the task 730*b* at the sensor node 704.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description.

The invention claimed is:

1. A method of execution of one or more tasks in an Internet-of-Things (IoT) environment assigned to a sensor node, the method comprising:
   determining an event associated with overloading of a first sensor node in the IoT environment based on resources available in real-time on the first sensor node, wherein the event is used as a basis for a decision for task offloading from the first sensor node to a second sensor node and is determined based on tasks pending for execution at the first sensor node;
   identifying one or more tasks executable by the second sensor node;
   establishing, by an assignment module, communication between the first sensor node and the second sensor node in the IoT environment;
   assigning the one or more tasks from the first sensor node to the second sensor node such that the second sensor node executes the one or more tasks, wherein the first and second sensor nodes are communicatively coupled to multiple sensors or include the multiple sensors, wherein the first and second sensor nodes are equipped with processing capabilities and detect physical quantities measured by the multiple sensors, and wherein the first and second sensor nodes are connected to an edge device;
   determining a non-transferrable resource requirement for non-transferrable tasks and new non-transferrable tasks, wherein the non-transferrable tasks are existing tasks on the first sensor node for execution only by the first sensor node, and wherein the new non-transferrable tasks are new tasks assigned to the first sensor node for execution only by the first sensor node; and
   predicting predicted resources on the first sensor node for execution of the one or more tasks on the first sensor node based on the non-transferrable resource requirement.

2. The method of claim 1, further comprising:
identifying the second sensor node capable of executing the one or more tasks.

3. The method of claim 1, further comprising:
receiving an executed result of the one or more tasks from the second sensor node.

4. The method of claim 1, further comprising:
defining overload parameters associated with the event associated with the overloading of the first sensor node, wherein the overload parameters are defined by a resource of the resources available on the first sensor node, a minimum task resource requirement associated with the one or more tasks, and the predicted resources on the first sensor node,
wherein the one or more tasks include one of transferrable tasks, predicted transferrable tasks, and new transferrable tasks, and
wherein the transferrable tasks are existing tasks assigned to the first sensor node for execution, the predicted transferrable tasks are predicted tasks that are routinely assigned to the first sensor node, and the new transferrable tasks are new tasks that are assigned to the first sensor node.

5. The method of claim 4, further comprising:
determining the minimum task resource requirement for executing the one or more tasks based on a resource requirement specification associated with the one or more tasks, wherein the resource requirement specification indicates minimum resources required for executing the one or more tasks in real-time;
comparing the minimum task resource requirement with the predicted resources on the first sensor node; and
determining whether the resources available are less than, equal to, or greater than the minimum task resource requirement.

6. The method of claim 5, further comprising:
determining whether one or more resources are configured to be freed-up on the first sensor node for execution of the new non-transferrable tasks when the resources available on the first sensor node are less than the non-transferrable resource requirement; and
releasing the one or more resources on the first sensor node by assigning one of the transferrable tasks and the new transferrable tasks to the second sensor node.

7. The method of claim 4, further comprising:
transmitting an overload message to the edge device when the resources available on the first sensor node are less than the minimum task resource requirement, wherein the overload message indicates an inability of the first sensor node to execute the one or more tasks; and
receiving a sensor node database associated with sensor nodes in the IoT environment capable of executing the one or more tasks.

8. The method of claim 1, further comprising:
determining a minimum task resource requirement for executing the one or more tasks based on a resource requirement specification associated with the one or more tasks, wherein the resource requirement specification indicates minimum resources required for executing the one or more tasks in real-time;

comparing the minimum task resource requirement with the predicted resources on the first sensor node; and determining whether the resources available are less than, equal to, or greater than the minimum task resource requirement.

9. The method of claim 1, further comprising:

determining whether one or more resources are configured to be freed-up on the first sensor node for execution of the new non-transferrable tasks when the resources available on the first sensor node are less than the non-transferrable resource requirement; and releasing the one or more resources on the first sensor node by assigning one of the transferrable tasks to the second sensor node.

10. The method of claim 1, further comprising:

transmitting an overload message to the edge device when the resources available on the first sensor node are less than a minimum task resource requirement, wherein the overload message indicates an inability of the first sensor node to execute the one or more tasks; and receiving a sensor node database associated with sensor nodes in the IoT environment capable of executing the one or more tasks.

11. A sensor node in an Internet-of-Things (IoT) environment, the sensor node comprising:

one or more processors;

a memory coupled to the one or more processors, wherein the memory and the one or more processors are configured to:

determine an event associated with overloading of the sensor node in the IoT environment based on resources available in real-time on the sensor node, wherein the event is used as a basis for a decision for task offloading from the sensor node to a second sensor node, and wherein the event is based on tasks pending for execution at the sensor node;

establish communication from the sensor node with the second sensor node in the IoT environment capable of executing one or more tasks, based on the event;

identify the one or more tasks to be executed by the second sensor node;

assign the one or more tasks from the sensor node to the second sensor node, when the communication is established, wherein the sensor node and the second sensor node are communicatively coupled to multiple sensors or include the multiple sensors, wherein the sensor node and the second sensor node are equipped with processing capabilities and detect physical quantities measured by the multiple sensors, and wherein the sensor node and the second sensor node are connected to an edge device;

determine a non-transferrable resource requirement for non-transferrable tasks and new non-transferrable tasks, wherein the non-transferrable tasks are existing tasks on the sensor node for execution only by the sensor node, and wherein the new non-transferrable tasks are new tasks assigned to the sensor node for execution only by the sensor node; and predict predicted resources on the sensor node for execution of the one or more tasks on the sensor node based on the non-transferrable resource requirement.

12. The sensor node of claim 11, wherein the memory and the one or more processors are further configured to:

define overload parameters associated with the event, wherein the overload parameters are defined by any one of resources available on the sensor node, a minimum task resource requirement associated with the one or more tasks, and the predicted resources on the sensor node, wherein the one or more tasks include one of transferrable tasks, predicted transferrable tasks, and new transferrable tasks, wherein the transferrable tasks are existing tasks assigned to the sensor node for execution;

determine the minimum task resource requirement for executing the one or more tasks based on a resource requirement specification associated with the one or more tasks, wherein the resource requirement specification indicates minimum resources required for executing the one or more tasks in real-time;

compare the minimum task resource requirement with the predicted resources on the sensor node; and determine whether the resources available are less than, equal to, or greater than the minimum task resource requirement.

* * * * *